United States Patent
Onuki et al.

(10) Patent No.: US 6,469,861 B2
(45) Date of Patent: *Oct. 22, 2002

(54) HEAD POSITIONING APPARATUS AND METHOD THEREFOR

(75) Inventors: Yoshikazu Onuki, Kanagawa; Hideaki Ishioka, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,936

(22) Filed: Jan. 6, 1999

(65) Prior Publication Data

US 2002/0122269 A1 Sep. 5, 2002

(30) Foreign Application Priority Data

Jan. 9, 1998 (JP) .......................................... 10-003325

(51) Int. Cl.[7] ................................................ G11B 5/596
(52) U.S. Cl. ................................................. 360/77.02
(58) Field of Search ......................... 360/77.02, 78.01, 360/78.09, 78.12, 77.04, 77.05, 78.07, 78.04; 369/43–46, 44.27, 44.28, 44.29, 47

(56) References Cited

U.S. PATENT DOCUMENTS

| | | | | |
|---|---|---|---|---|
| 4,969,059 A | * | 11/1990 | Volz et al. | 360/77.04 X |
| 5,177,718 A | | 1/1993 | Takeuchi | |
| 5,339,206 A | | 8/1994 | Takahashi | |
| 5,550,685 A | * | 8/1996 | Drouin | 360/77.08 |
| 5,592,346 A | * | 1/1997 | Sullivan | 360/77.04 |
| 5,949,605 A | * | 9/1999 | Lee et al. | 360/77.04 |
| 6,141,175 A | * | 10/2000 | Nazarian et al. | 360/77.04 |

* cited by examiner

Primary Examiner—David Hudspeth
Assistant Examiner—K. Wong
(74) Attorney, Agent, or Firm—Frommer Lawrence & Haug LLP; William S. Frommer

(57) ABSTRACT

A head positioning control apparatus and method which compensates for positional deviation of a magnetic head with respect to the positioning of the head on a particular track of a disc recording medium via a tracking control. Additionally, during a seek mode of the apparatus, a head that was positioned as a result of the tracking control is moved to a neighboring track of the disc recording medium. The seek mode uses the information obtained during the tracking mode to correct any disturbance frequencies occurring in synchronism with the rotational frequency of the disc recording medium, even if the head travels over a large distance.

6 Claims, 11 Drawing Sheets

US 6,469,861 B2

HEAD POSITIONING APPARATUS AND METHOD THEREFOR

BACKGROUND OF THE INVENTION

1. Field of the Invention

This invention relates to a head positioning control apparatus and a method therefor and more particularly, is suitably applied to a disc apparatus for recording on and reproducing from a disc recording medium, such as a magnetic disc, a magneto-optical disc, and an optical disc.

2. Description of the Related Art

A magnetic disc apparatus out of this type of disc apparatus is adapted to control the positioning of a magnetic head by sequentially switching three kinds of operation modes: a seek mode for rapidly moving the magnetic head to the vicinity of target position, a settling mode for settling the magnetic head at the target position, and a tracking mode for forcing the magnetic head to track the target position, in accordance with a positioning state of the magnetic head.

Particularly in a magnetic disc apparatus having a fixed medium, such as a Winchester disc, servo information is often written (hereinafter, this operation is referred to as the "servo write") after the apparatus is assembled. A disturbance produced in synchronism with a rotation of a disc at that time (hereinafter, this is referred to as the disc rotation synchronized disturbance) is not so large, so that it can be suppressed by ensuring a sufficient control bandwidth through a closed loop system using a proportional, integration and differential (PID) compensator, an H ∞ controller or the like upon tracking.

However, in a magnetic disc apparatus of a medium exchangeable type, such as a disc pack, a first-order component of disc rotation synchronized disturbance (eccentricity) generally varies whenever a medium is replace with another. Also, second-order and more disturbance components may often become large as compared with a magnetic disc apparatus of the fixed medium type, depending upon the rotation accuracy of a spindle motor or the like during the servo write.

More specifically, an ith component (i is a natural number) of disc rotation synchronized disturbance may occur when the disc suffers from eccentricity (i=1); when a track on the disc is deformed into an oval or indefinite shape (i=2); when a stamper, from which the disc is manufactured, has been deformed (i≧3); and so on.

Further, from the fact that requirements to the head positioning accuracy has become more strict due to narrower track pitches, it is more and more difficult to ensure a sufficient suppression ratio for the disc rotation synchronized disturbance. For this reason, the introduction of a filter for suppressing the disc rotation synchronized disturbance has been proposed, wherein a sinusoidal wave generating model is inserted in a closed loop, in an application of an internal model principle, to increase the gain at its disturbance frequency to ensure the suppression ratio. As one of such filters for suppressing disc rotation synchronized disturbance, an adaptive feedforward canceller (AFC: Adaptive Feedforward Cancellation) has been proposed.

Here, a control system 1 using the AFC is illustrated in FIG. 1. This control system 1 is operative when a synchronized disturbance d(t) at a predetermined frequency is inputted to a controlled object P(s) to suppress the disturbance frequency using a digital AFC filter 2. First, when a periodic synchronized disturbance d(t) is inputted to the controlled object P(s) through an adder 3, the controlled object P(s) is provided with a component of the periodic synchronized disturbance d(t), and sends an output y(t) in accordance with the component to the outside and to the AFC filter 2.

Assuming that the frequency of this periodic synchronized disturbance d(t) is represented by $\omega_i/2\pi$, the periodic synchronized disturbance d(t) is expressed by the following equation:

$$d(t)=A_i\cos(\omega_i t)+B_i\sin(\omega_i t) \tag{1}$$

Subsequently, in the AFC filter 2, the output y(t) of the controlled object P(s) is provided to corresponding multipliers 3, 4, where the output y(t) is multiplied by cos $(\omega_i t+\Phi_i)$ and sin $(\omega_i t+\Phi_i)$, respectively. Then, the multiplication results are supplied to integrators 6, 7, respectively. The integrators 6, 7 integrate the multiplication results of the multipliers 4, 5, respectively, to produce AFC coefficients $a_i$ and $b_i$, respectively. $\Phi_i$ represents the phase value of the frequency $\omega_i/2\pi$ in the transfer function from an AFC addition point (u(t)) of the controlled object P(s) to an AFC draw-in point (y(t)).

The AFC coefficients $a_i$ and $b_i$ thus produced are multiplied by cos $(\omega_i t)$ and sin $(\omega_i t)$, respectively, in multipliers 8, 9 corresponding thereto, and then the respective multiplication results are added in an adder 10, with the addition result serving as an input u(t) to the controlled object P(s). This input u(t) is expressed by the following equation:

$$u(t)=a_i\cos(\omega_i t)+b_i\sin(\omega_i t) \tag{2}$$

The adder 3 adds this input u(t) to the periodic synchronized disturbance d(t) to suppress a predetermined frequency component within the periodic synchronized disturbance d(t). In this way, a feedforward control using the AFC filter 2 as mentioned is repeated so that the AFC coefficients a and b are both converged to the AFC coefficients A and B represented in the periodic synchronized disturbance d(t), and consequently, the periodic synchronized disturbance d(t) is canceled by the input u(t) in the adder 3.

Actually, since the calculation processing performed by the AFC filter 2 (hereinafter, this is referred to as the "AFC calculation processing") is generally performed in a digital signal processor (DSP), the AFC coefficients a and b are updated in accordance with update rules expressed by the following equations, respectively:

$$a_i(kT)=a_i((k-1)T)+g_iy(kT)\cos(\omega_i kT+\Phi_i) \tag{3}$$

$$b_i(kt)=b_i((k-1)T)+g_iy(kT)\sin(\omega_i kt+\Phi_i) \tag{4}$$

where k is an integer indicative of a sampling time, and T is a sampling interval. In this event, the system function (transfer function) of the AFC filter 2, C(t) (=u(t)/y(t)), is expressed by the following equation:

$$C_i(t) = \frac{t(\cos(\Phi_i)t - \cos(\omega_i T + \Phi_i))}{t^2 - 2\cos(\omega_i T)t + 1} \tag{5}$$

Next, FIG. 2 illustrates a conventional magnetic disc apparatus 10. The magnetic disc apparatus 10 rotates a plurality of magnetic discs 11A and 11B at a high speed in accordance with the rotation of a spindle motor 12 for driving them, and simultaneously moves magnetic heads 14A to 14D mounted at respective tips of movable arms 13 in accordance with the driving of a voice coil motor (VCM) 15 to align them corresponding to one face 11AX, 11BX and the other face 11AY, 11BY of each magnetic disc 11A, 11B, so that data is recorded or reproduced by each of the magnetic heads 14A to 14D which follows respective tracks formed concentrically or spirally on the one face 11AX, 11BX and the other face 11AY, 11BY of each of the magnetic discs 11A, 11B.

Servo schemes for use in this magnetic disc apparatus 10 include a so-called embedded servo scheme, a servo face servo scheme, and so on. In the embedded servo scheme, a plurality of servo regions are formed such that they radially extend from the center of a disc to equi-angularly divide data regions, and servo information is embedded between the data regions. The servo face servo scheme, which is intended for a large capacity magnetic disc apparatus having a plurality of discs, specifies one face of one magnetic disc among them as a face dedicated to servo information, such that servo information is embedded entirely over the specified face.

With a servo scheme as mentioned, respective servo regions formed on the faces 11AX, 11BX and the other faces 11AY, 11BY of the magnetic discs 11A, 11B are formed with servo information serving as a time base, from which positional information can be provided for the magnetic heads 14A to 14D.

A reproduced signal S1 derived by reproducing servo information in the respective servo regions on the faces 11A, 11BX and the other faces 11AY, 11BY of the magnetic discs 11A, 11B by the magnetic heads 14A to 14D are amplified by a preamplifier 15, and converted into a digital form by an A/D converter 16 to generate a reference signal S2 which is sent to a position error signal generator 17.

The position error signal generator 17 generates a position error signal (PES) S3 representing how far the respective magnetic heads 14A to 14D deviate from their target tracks based on the reference signal S2, and sends the position error signal S3 to an adder 19 and a switch 20 in an AFC correction control system 18.

The AFC correction control system 18 supplies the error signal S3 to four AFC filters 21A to 21D, respectively, through the switch 20, executes the aforementioned AFC calculation processing to suppress the first-order to fourth-order components of a disc rotation synchronized disturbance, and then adds the outputs of the AFC filters 21A to 21D by an adder 22. The addition result is sent to the adder 19 through a switch 23 as an AFC output signal S4.

The switches 20, 23 are connected to an ON state only in a tracking mode, and are left in an OFF state in a seek mode or in a settling mode, other than the tracking mode, under the control of a mode switch signal S5 which is supplied from a control mode switching unit 24.

Assuming herein that the rotational frequency of the magnetic discs 11A, 11B is $\omega/2\pi$, the system functions $C_1(z)$ to $C_4(z)$ of the AFC filters 21A to 21D for canceling the first-order to fourth-order components of the disc rotation synchronized disturbance are expressed by the following equations, respectively:

$$C_1(z) = g_1 \frac{z(\cos(\Phi_1)z - \cos(\omega T + \Phi_1))}{z^2 - 2\cos(\omega T)z + 1} \quad (6)$$

$$C_2(z) = g_2 \frac{z(\cos(\Phi_2)z - \cos(2\omega T + \Phi_2))}{z^2 - 2\cos(2\omega T)z + 1} \quad (7)$$

$$C_3(z) = g_3 \frac{z(\cos(\Phi_3)z - \cos(3\omega T + \Phi_3))}{z^2 - 2\cos(3\omega T)z + 1} \quad (8)$$

-continued $$C_4(z) = g_4 \frac{z(\cos(\Phi_4)z - \cos(4\omega T + \Phi_4))}{z^2 - 2\cos(4\omega T)z + 1} \quad (9)$$

The adder 19, on the other hand, adds the phase error signal S3 supplied from the phase error signal generator 17 and the AFC output signal S4 derived from the addition results of the four AFC filters 21A to 21D to generate an AVD correction signal S6.

Subsequently, a pair of switches 29, 30 each having three input and output terminals are disposed before and after a tracking controller 26, a settling controller 27 and a seek controller 28. The switches 29, 30 are switched in association with each other based on a mode switching signal S5 supplied from the control mode switching unit 24 such that an output terminal of one switch is connected to an input terminal of the other switch at the same position.

Thus, when the magnetic heads 14A to 14D are positioned at their respective target tracks, the AFC correction control system 18 switches the switches 20, 23 to an ON state only in the tracking mode and switches the switches 20, 23 to an OFF state in the subsequent seek mode and settling mode as the magnetic disc apparatus is switched sequentially to the seek mode, the settling mode and the tracking mode.

In this way, the AFC output signal S4 is sent to the adder 19 only in the tracking mode so that the adder 19 adds the AFC output signal S4 and the phase error signal S3 to generate the AFC correction signal S6 which is sent to the tracking controller 26.

The tracking controller 26 calculates head position information on the magnetic heads 14A to 14D based on the AFC correction signal S6 to generate a head driving signal S7 which is converted into an analog form by a D/A converter 31 and then sent to a voice coil motor driver 32. As a result, the voice coil motor driver 32 can drive a voice coil motor 33 based on the head driving signal S7 to make the magnetic heads 14A to 14D follow target tracks formed on the corresponding faces 11AX, 11BX, 11AY, 11BY of the magnetic discs 11A, 11B, respectively.

In the seek mode or the settling mode, on the other hand, the error signal S3 generated by the error signal generator 17 is supplied directly to the settling controller 27 or the seek controller 28. The settling controller 27 or the seek controller 28 respectively calculates head position information, and sends its calculation result to the voice coil motor driver 32 through a D/A converter 31 as a head driving signals S8 or S9. Consequently, the voice coil motor driver 32 can drive the voice coil motor driver 32 based on the head driving signal S8 or S9 to have the magnetic heads 14A to 14D seek or settle on target tracks formed on the corresponding faces 11AX, 11BX, 11AY, 11BY of the magnetic discs 11A, 11B, respectively.

In the magnetic disc apparatus 10 configured as described above, the AFC filters 21A to 21D execute the aforementioned AFC calculation processing based on the error signal S3 derived by reproducing the magnetic discs 11A, 11B and adds the AFC output signal S4 as the calculation result to the error signal S3 to sufficiently suppress a disturbance frequency which occurs in synchronism with the rotational frequency of the magnetic discs 11A, 11B derived from the error signal S3.

When the magnetic heads 14A to 14D are moved from tracks, on which the magnetic heads 14A to 14D are currently positioned under the tracking control, to desired target tracks, the tracking controller 26 instructs the seek controller 28 to perform mode switching to have the magnetic heads 14A to 14D seek from the currently positioned tracks to the target tracks. In this event, the AFC coefficients as the AFC calculation results by the AFC filters 21A to 21D are converged values derived when the tracking control was performed, and the seek controller 28 is supplied with the AFC correction signal S6 which has disc rotation synchronized disturbance corrected on the basis of the converged values.

Therefore, since the seek controller 28 has the magnetic heads 14A to 14D seek the target tracks before the disc rotation synchronized disturbance has not been completely corrected, it is likely that the magnetic heads 14A to 14D fail to settle to the target tracks even if the seek control is performed. This leads to a problem that the feedforward control using the converged AFC coefficients derived in the tracking mode becomes highly difficult in the seek mode.

The magnetic disc apparatus of the medium exchangeable type, on the other hand, is likely to suffer from very large eccentricity so that a compensation for disturbance of a particular frequency component is desired even in the seek mode. However, since the magnetic heads 14A to 14D move in the radial direction over the magnetic discs 11A, 11B, which are rotating at a high speed, during the seek mode, the AFC filters 21A to 21D cannot execute the aforementioned AFC calculation processing based on the error signal S3 to update the values of AFC coefficients, consequently resulting in a problem that considerable difficulties are encountered in compensating for a disturbance frequency which is in synchronism with the rotational frequency of the magnetic discs 11A, 11B.

Further, the disturbance frequency which was not able to be compensated for in the seek mode is likely to more adversely affect the positioning during the settling mode, causing a problem that the magnetic heads 14A to 14D cannot be positioned to desired target tracks on the magnetic discs 11A, 11B.

SUMMARY OF THE INVENTION

In view of the foregoing, an object of this invention is to provide a head positioning control apparatus and a method therefor which can significantly improve the head positioning accuracy with a simple configuration.

The foregoing object and other objects of the invention have been achieved by the provision of a head positioning control apparatus and a method therefor, in which position error signal generating means generates a position error signal indicative of the amount of positional deviation of a head with respect to a first target track on a disc recording medium, frequency correcting means generates frequency correction coefficients for correcting a disturbance frequency occurring in synchronism with a rotational frequency of the disc recording medium when a tracking control is performed on the basis of the position error signal, and head moving means moves the head from the first target track on the disc recording medium, on which the head is positioned as a result of the tracking control, to a neighboring position of a next second target track based on the position error signal and the frequency correction coefficients.

As a result, the head moving means moves the head from the first target track on the disc recording medium, on which the head is positioned as a result of a tracking control, to a neighboring position of the next second target track based on frequency correction coefficients derived from the frequency correcting means when the tracking control is performed on the basis of a position error signal, so that a disturbance frequency occurring in synchronism with the rotational frequency of the disc recording medium can be corrected even in an operation in which the head moving means causes the head to travel over a large amount of distance.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Configuration of Magnetic Disc Apparatus According to First Embodiment

Figure 1:
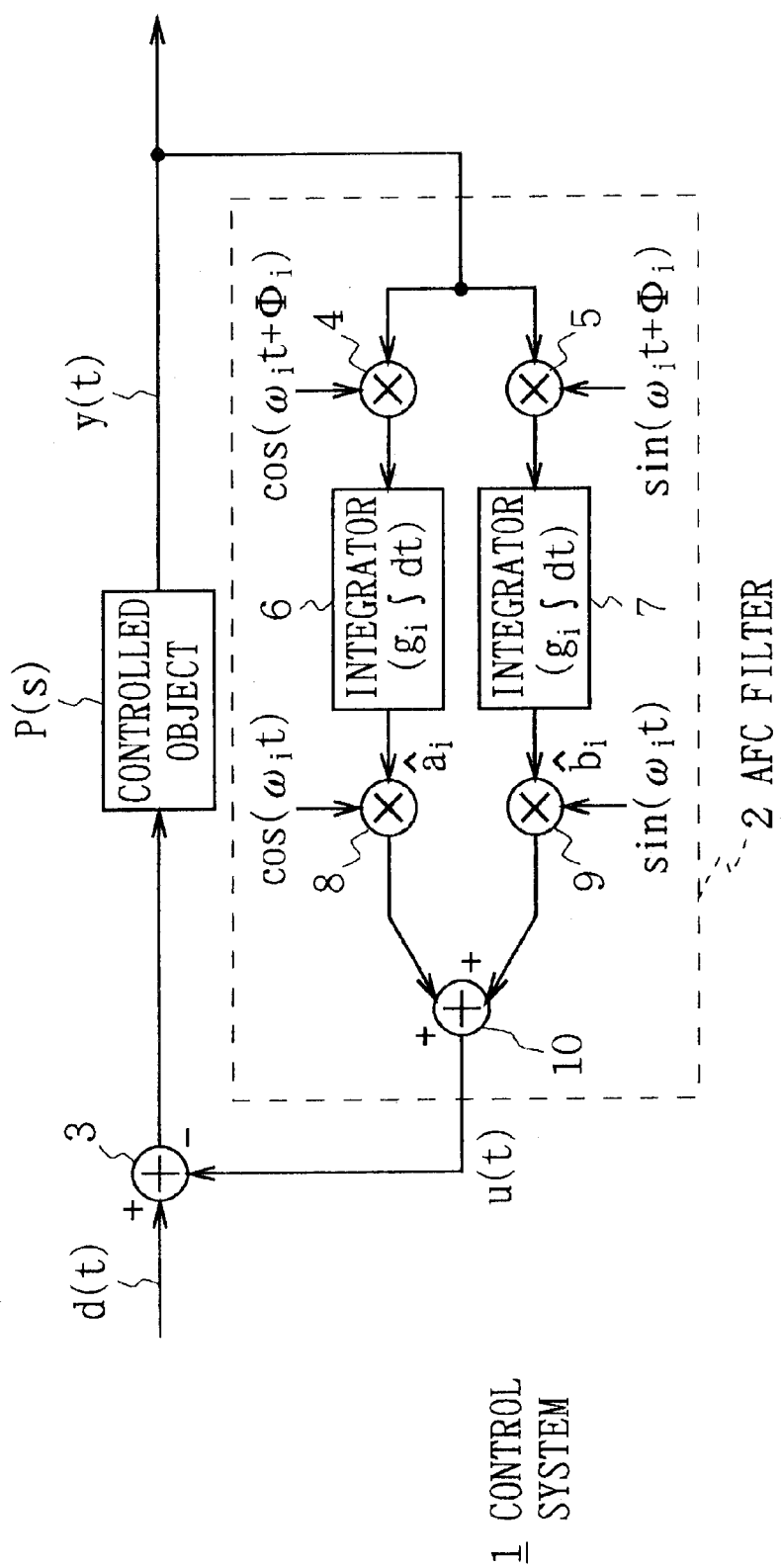
FIG. 1 is a block diagram used for describing the principle of an AFC control system.
Figure 2:
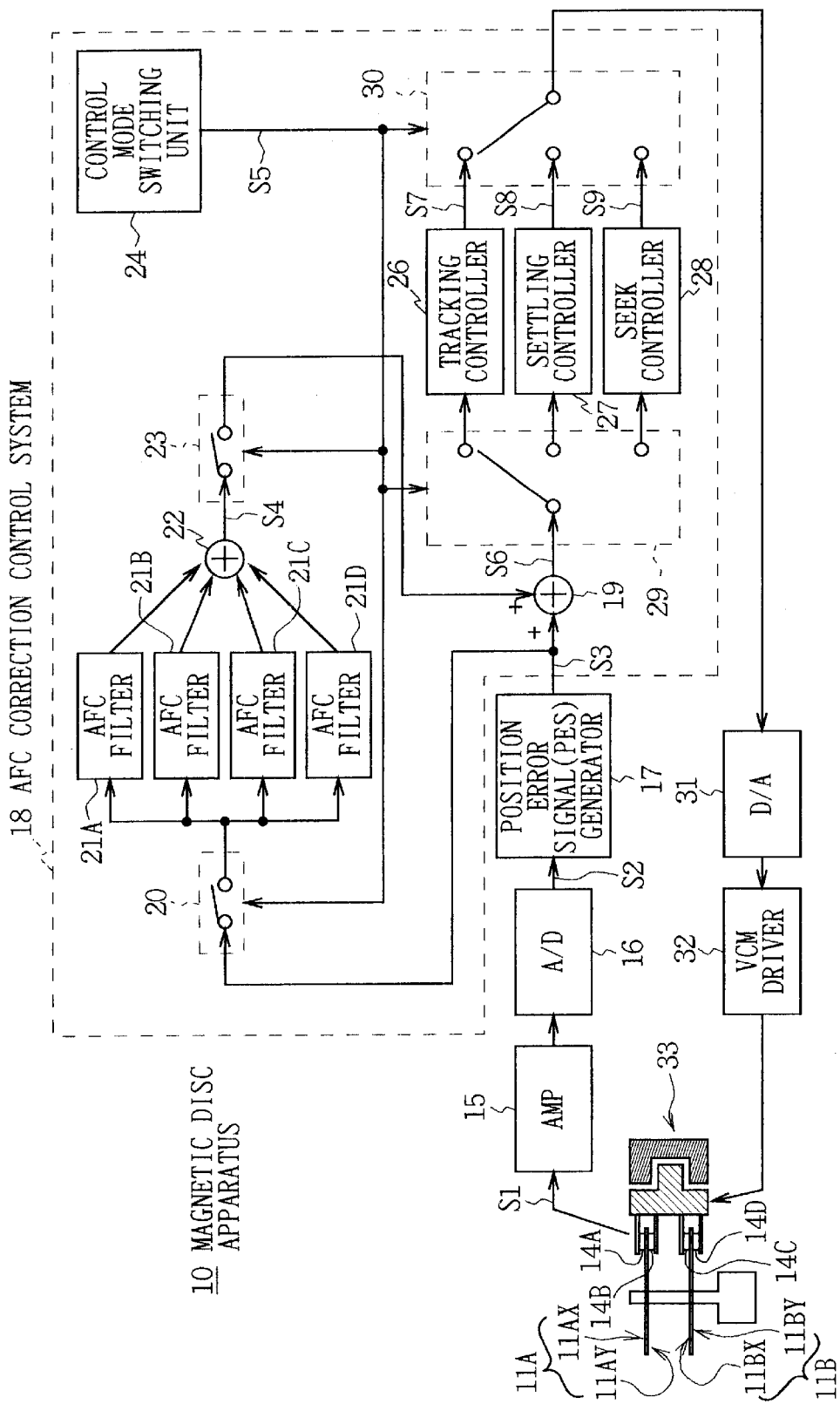
FIG. 2 is a block diagram illustrating the configuration of a conventional magnetic disc apparatus.
Figure 3:
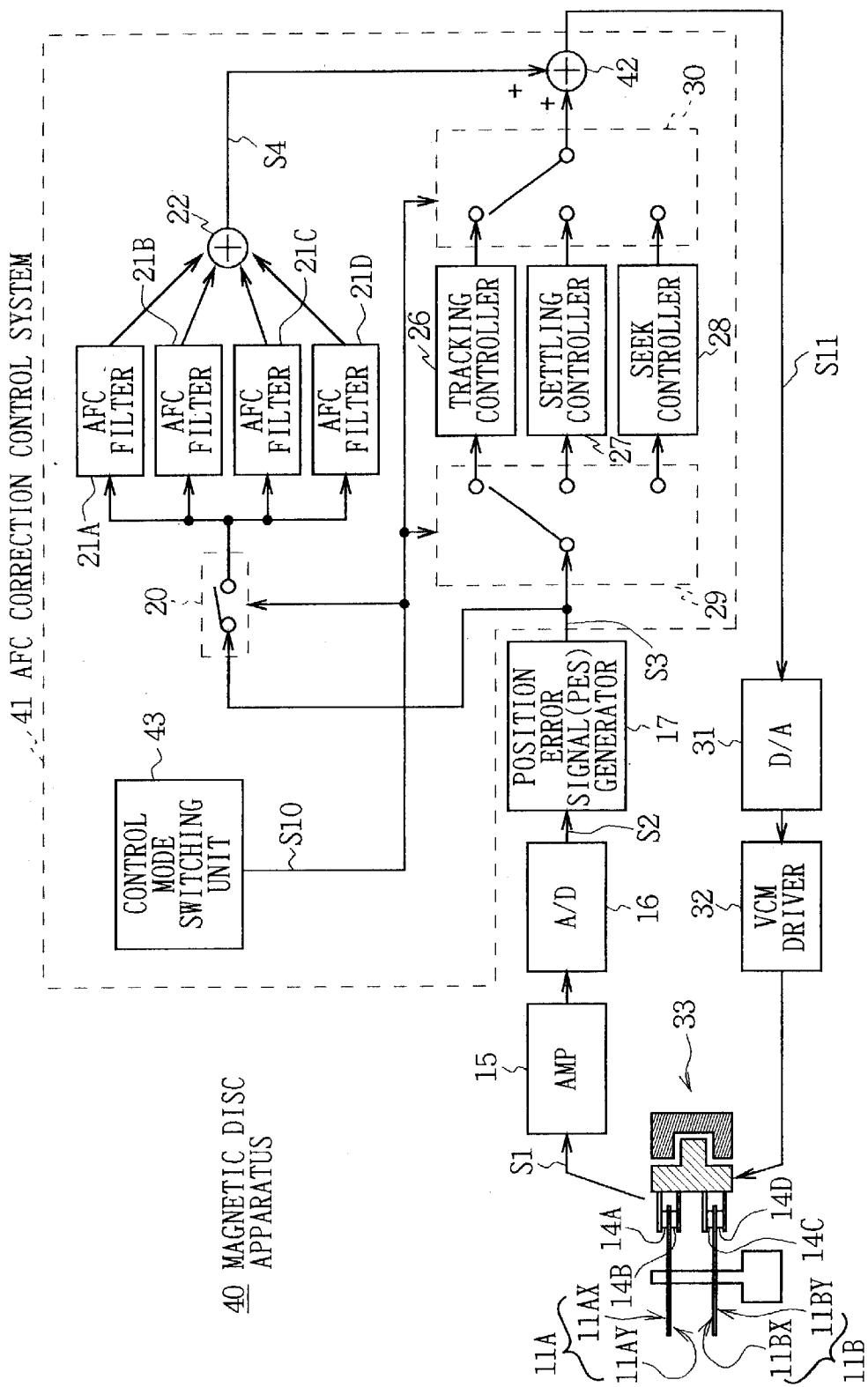
FIG. 3 is a block diagram illustrating the configuration of a magnetic disc apparatus according to a first embodiment.

In FIG. 3, where parts corresponding to those in FIG. 1 are designated the same reference numerals, a magnetic disc apparatus according to a first embodiment is generally designated by reference numeral 40, and is configured similar to the conventional magnetic disc apparatus 10 except that an AFC correction control system 41 has a different configuration.

In this magnetic disc apparatus 40, a plurality of magnetic discs 11A, 11B are rotated at a high speed in accordance with the rotation of a spindle motor 12 for driving the discs, while magnetic heads 14A to 14D mounted at respective tips of movable arms 13 are moved in accordance with a driving operation of a voice coil motor (VCM) 15 to position the magnetic heads 14A to 14D corresponding to faces 11AX, 11BX on one side of the magnetic discs 11A, 11B and faces 11AY, 11BY on the other side of the magnetic discs 11A, 11B, respectively, whereby the magnetic heads 14A to 14D follow respective tracks formed concentrically or spirally on the faces 11AX, 11BX and the other face 11AY, 11BY of the magnetic discs 11A, 11B to record or reproduce audiovisual data on the tracks.

Also, in this magnetic disc 40, servo information, serving as time base, is formed in respective servo regions formed on the faces 11AX, 11BX and the other faces 11AY, 11BY of the magnetic discs 11A, 11B in accordance with an embedded servo scheme, a servo face servo scheme or the like, such that positional information on the magnetic heads 14A to 14D are provided from this servo information.

A reproduced signal S1, which is derived by reproducing the servo information in the respective servo regions on the faces 11AX, 11BX and the other faces 11AY, 11BY of the magnetic discs 11A, 11B by the magnetic heads 14A to 14D, is amplified by a preamplifier 15, digitally converted by an A/D converter 16 into a digital signal which is sent to an error signal generator 17 as a reference signal S2.

The error signal generator 17 generates a position error signal (PES) S3 representing how far the respective magnetic heads 14A–14D deviate from their target tracks based on the reference signal S2, and sends the position error signal S3 to switches 20, 29 in an AFC correction control system 18.

In the AFC correction control system 41, the error signal S3 generated from the error signal generator 17 is applied to AFC filters 21A to 21D through the switch 20, respectively, and alternatively applied to either one of a tracking controller 26, a settling controller 27 and a seek controller 28 through the switch 29.

The AFC filters 21A to 21D execute the aforementioned AFC calculation processing based on the error signal S3 to suppress first-order to fourth-order components of a disc rotation synchronized disturbance, and then supplies their outputs to an adder 22 which adds these outputs to generate an AFC output signal S4 which is sent to an adder 42.

The error signal S3 sent to the tracking controller 26, the settling controller 27 or the seek controller 28 through the switch 29, on the other hand, is applied to the adder 42 through a switch 30 after predetermined head control processing has been performed in a corresponding controller.

The switches 29, 30 are controlled to be switched to the tracking controller 26, the settling controller 27 and the seek controller 28 at predetermined timing based on a mode switching signal 510 supplied from a control mode switching unit 43 in the order of larger control movement amounts for the magnetic heads 14A to 14D, i.e., in the order of the seek controller 28, the settling controller 27 and the tracking controller 26. Together with these switches, the switch 20 is also switched on the basis of the mode switching signal S10 supplied from the control mode switching unit 43 to an ON state from the time a predetermined time period has been elapsed in a settling mode to a tracking mode, and otherwise to an OFF state from a seek mode to the time the predetermined time period has been elapsed in the settling mode.

The adder 42 adds the AFC output signal S4 and the output of an associated controller selected from the tracking controller 26, the settling controller 27 and the seek controller 28, and sends the sum as an AFC correction signal S11 to a voice coil motor driver 32 through a D/A converter 31.

The voice coil motor driver 32 can drive a voice coil motor 33 based on the AFC correction signal S11 to position the magnetic heads 14A to 14D on their target tracks formed on the corresponding faces 11AX, 11BX, 11AY, 11BY of the magnetic discs 11A, 11B.

In this AFC correction control system 41, the AFC calculation processing, which has been performed from the time the predetermined time period has been elapsed in the settling mode to the tracking mode, is continuously executed as it is without inputting the error signal S3 to the AFC filters 21A–21D from the seek mode to the time the predetermined time period has been elapsed in the settling mode.

Figure 4:
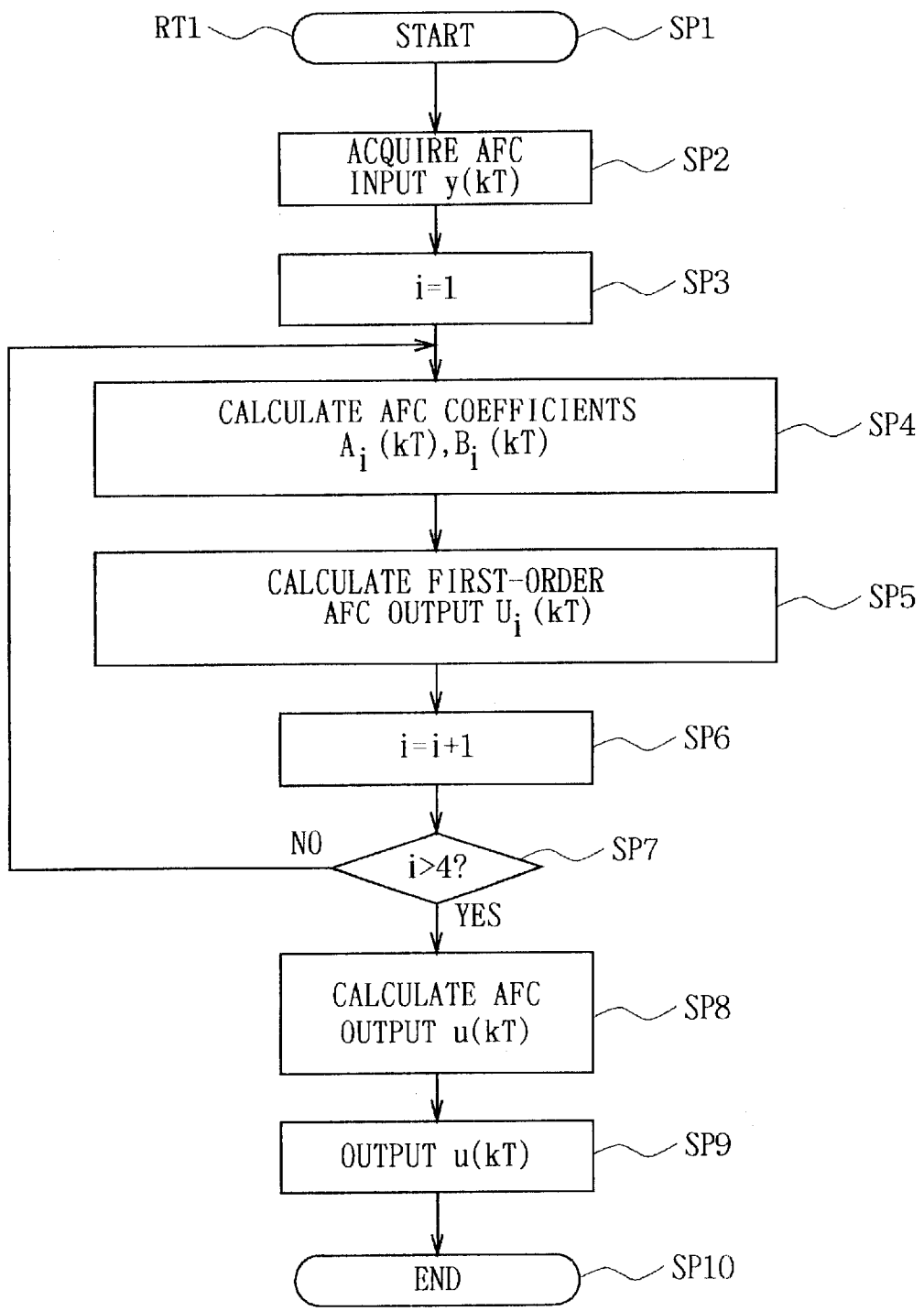
FIG. 4 is a flow chart illustrating an AFC calculation processing procedure in a tracking mode.

Here, FIG. 4 illustrates a calculation processing procedure RT1 executed by the respective AFC filters 21A to 21D from the time the predetermined time period has been elapsed in the settling mode to the tracking mode. An AFC filter 21A to 21D corresponding to an ith order component of a disc rotation synchronized disturbance (i=1 to 4: i indicates the order number of disc rotation synchronized disturbance) enters the calculation processing procedure RT1 from step SP1. When the error signal S3 is inputted at step SP2, the procedure proceeds to the subsequent step SP3, where set values in the respective AFC filters 21A to 21D are cleared (i=1), followed by the procedure proceeding to step SP4.

At step SP4, the AFC filter 21A calculates (updates) AFC coefficients $a_i(kT)$ and $b_i(kT)$ from the aforementioned equations (3), (4) based on the error signal S3 represented by y(t). The AFC coefficients $a_i(kT)$ and $b_i(kT)$ are expressed by the following equations, respectively:

$$a_i(kT)=a_i((k-1)T)+g_iy(kT)\cos(i*\omega kt+\Phi_i) \quad (10)$$

$$b_i(kT)=b_i((k-1)T)+g_iy(kT)\sin(i*\omega kt+\Phi_i) \quad (11)$$

Subsequently, at step SP5, the AFC filter 21A multiplies the AFC coefficients $a_i(kT)$ and $b_i(kT)$ by cos $(\omega_i t)$ and sin $(\omega_i t)$, respectively. In this way, the AFC filter 21A can produce an input $u_i(t)$ by accumulatively adding respective multiplication results for the disturbance order number (i=1) which is to be compensated for. Specifically, $u_i(kT)$ is expressed by the following equation:

$$u_i(kT)=a_i(kT)\cos(i*\omega kt)+b_i(kT)\sin(i*\omega kt) \quad (12)$$

Subsequently, at step SP7, the AFC filters 21B to 21D corresponding to the ith order (i=2 to 4) components of the disc rotation synchronized disturbance sequentially perform similar processing to steps SP4, SP5, until the order number of the disturbance becomes larger than 4, to produce inputs ui(t) (i=2 to 4).

Consequently, at step SPB, the inputs $u_i(t)$ (i=1 to 4) outputted from the AFC filters 21A to 21D are added in the adder 22 which then sends the addition result to the adder 42 as an AFC output signal S4, followed by the termination of the calculation processing procedure RT1 at step SP10. Specifically, the AFC output signal S4 is expressed as u(t) by the following equation:

$$u(kT) = \sum_{i=0\,to\,4} u_i(kT) \quad (13)$$

Figure 5:
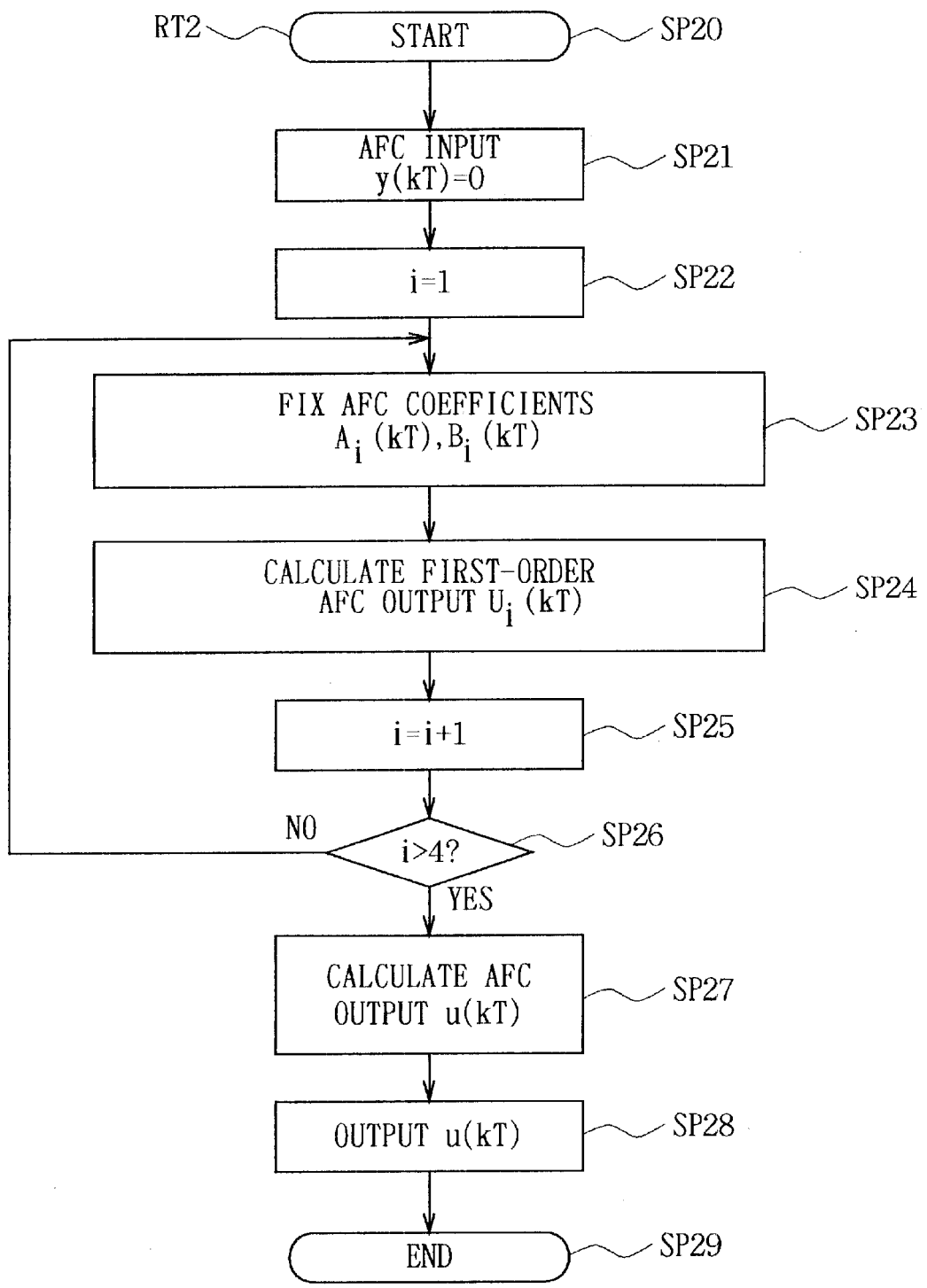
FIG. 5 is a flow chart illustrating an AFC calculation processing procedure in a seek mode.

Next, FIG. 5 illustrates a calculation processing procedure RT2 executed by the respective AFC filters 21A to 21D when the AFC coefficients are not updated in the predetermined time period after the settling mode is started or in the seek mode. This processing procedure RT2 is a similar processing procedure to the calculation processing procedure RT1 illustrated in FIG. 4, except that the AFC coefficients $a_i(kT)$ and $b_i(kT)$ are fixed values.

The AFC filters 21A to 21D corresponding to ith components (i=1 to 4) of the disc rotation synchronized disturbance enter this calculation processing procedure from step SP20. At step SP21, since the switch 20 (FIG. 3) is held in an OFF state, the error signal S3 is not inputted. In other words, y(kT)=0 stands. Subsequently, at step SP22, set values in the respective AFC filters 21A to 21D are cleared (i=1), followed by the procedure proceeding to step SP23.

At step SP23, the AFC filter 21A is fixed to AFC coefficients immediately before the seek control is entered, i.e., AFC coefficients $a_i(kT)$ and $b_i(kT)$ which have been derived when the tracking control was performed. In this event, the AFC coefficients $a_i(kT)$ and $b_i(kT)$ are expressed by the following equations, respectively:

$$a_i(kt)=a_i((k-1)T) \tag{14}$$

$$b_i(kt)=b_i((k-t)T) \tag{15}$$

By multiplying such coefficient values by cos ((ωt) and sin (ωt), the AFC coefficients are continuously outputted. In the following, similar processing at steps SP5 to SP10 illustrated in the aforementioned calculation processing procedure RT1 in the tracking mode are executed at the subsequent steps SP24 to SP29.

In this way, when the magnetic heads 14A to 14D are controlled for tracking, for example, at predetermined outer peripheral positions of the magnetic discs 11A, 11B, the AFC coefficients are converged to predetermined values in the AFC filters 21A to 21D since the magnetic discs 11A, 11B generally exhibit constant amounts of eccentricity. When the magnetic discs 14A to 14D are subsequently forced to seek from the outer peripheral positions to predetermined inner peripheral positions of the discs, the AFC coefficients, which are converged values derived when the tracking control was performed at the outer peripheral positions, can also be applied to the inner peripheral positions.

In the magnetic disc apparatus 40 configured as described above, when an ith order component (i is a natural number) of a disc rotation synchronized disturbance occurs due to high speed rotation of the magnetic discs 11A, 11B, a disturbance frequency synchronized with the rotational frequency of the respective magnetic discs 11A, 11B occurs in the reference signal S2 reproduced from servo regions on the disc faces corresponding to the order number of the external disturbance.

In the tracking mode, the error signal S3 generated on the basis of the reference signal S2 passes through the AFC filters 21A to 21D and the adder 22 in sequence, wherein the aforementioned AFC calculation processing has been executed on the error signal, and then added to the output of the tracking controller 26 in the adder 42, and outputted as the AFC correction signal S11.

By feedback controlling the AFC correction signal S11 in a tracking servo loop including the tracking controller 26, the AFC coefficients derived by the respective AFC calculation processing of the AFC filters 21A to 21D are sequentially updated and converged to predetermined values. Consequently, the magnetic heads 14A to 14D are correctly controlled for tracking in accordance with the AFC correction signal S11 which has been corrected for the disc rotation synchronized disturbance.

Here, when the magnetic heads 14A to 14D currently held on tracking controlled tracks (first target tracks) are positioned to next target tracks (second target tracks), the mode is switched from the tracking mode to the seek mode at this time to have the magnetic heads 14A to 14D seek from the currently positioned tracks to the next target tracks.

In this event, the finally converged values in the preceding tracking mode immediately before the mode was switched are applied for the AFC coefficients derived by the AFC calculation processing of the AFC filters 21A to 21D. Specifically, after the AFC filters 21A to 21D have executed the AFC calculation processing for the error signal S3 based on the converged values, the adder 22 adds the calculation processing results of the AFC filters 21A to 21D to the output of the seek controller 28.

Thus, since the magnetic heads 14A to 14D are moved in the radial direction of the magnetic discs 11A, 11B in the seek mode, it is very difficult to measure the disturbance frequency occurring in synchronism with the rotational frequency of the magnetic discs 11A, 11B. However, even in the seek mode in which the magnetic heads 14A to 14D involve a larger amount of travel, it is possible to correct the disc rotation synchronized disturbance occurring in the output of the seek controller 28 based on the AFC coefficients derived by the AFC calculation processing in the tracking mode. Also, the current AFC coefficients used in the seek mode are used to derive converged values of the AFC coefficients in the next tracking mode.

According to the configuration described above, the magnetic disc apparatus 40 corrects the disturbance frequency synchronized with the rotational frequency of disc recording media in the seek mode based on the AFC coefficients derived by the AFC calculation processing when the tracking control was performed on the basis of the error signal S3, so that the disc rotation synchronized disturbance can be corrected even in an operation in which the magnetic heads 14A to 14D involve a large amount of travel as is the case of the seek mode, thereby making it possible to realize the magnetic disc apparatus 40 which is capable of improving the head positioning accuracy in a simple configuration.

The first embodiment has been described for the case where the magnetic heads 14A to 14D are controlled to seek or settle on next target tracks on the faces 11AX, 11BX and the other faces 11AY, 11BY of the magnetic discs 11A, 11B based on the AFC coefficients $a_i(kT)$ and $b_i(kT)$ expressed by the equations (14), (15), respectively, which have been derived by the AFC calculation processing when the tracking control was performed. The present invention, however, is not limited to this manner of control. Alternatively, the faces 11AX, 11BX and the other faces 11AY, 11BY of the magnetic discs 11A, 11B may be radially divided into a plurality of regions such that the AFC coefficients $a_i(kT)$ of the equation (14) and $b_i(kT)$ the equation (15), derived when the tracking control was performed, are assigned to the respective regions, and stored in storage means (not shown), for example, RAM, memory or the like.

Figure 6:
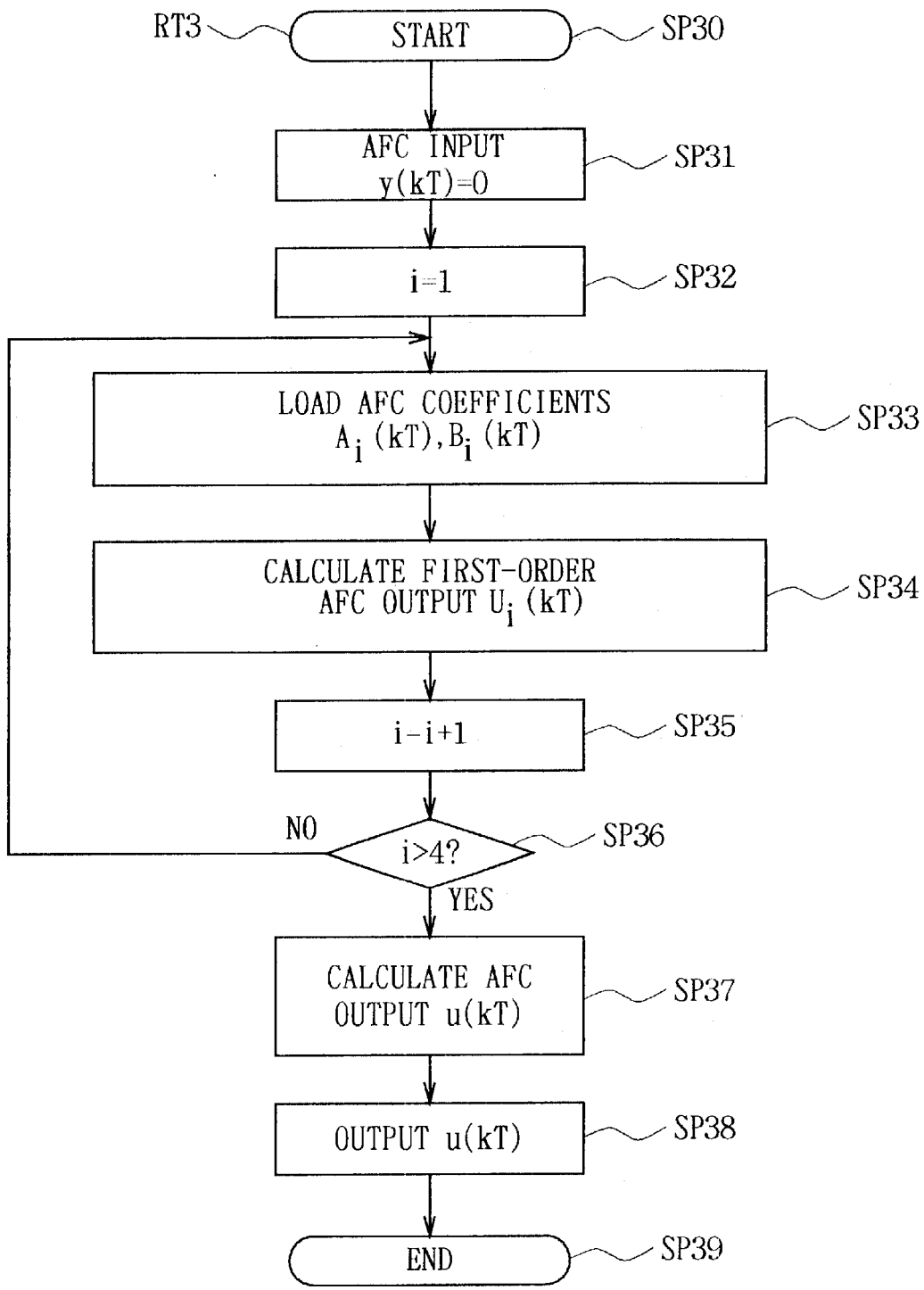
FIG. 6 is a flow chart illustrating an AFC calculation processing procedure in the seek mode according to another embodiment.

For this case, FIG. 6 illustrates a calculation processing procedure RT3 executed by the respective AFC filters 21A to 21D for reading fixed AFC coefficients from the storage means in a predetermined time period after the settling mode has been started or in the seek mode. This calculation processing procedure RT3 is similar to the calculation processing procedure RT2 illustrated in FIG. 5 except that fixed values of the AFC coefficients $a_i(kT)$ and $b_i(kT)$ are loaded from the storage means in the seek mode or in the settling mode.

Turning back to FIG. 3, actually, the control mode switching unit 43 reads the AFC coefficients $a_i(kT)$ and $b_i(kT)$ stored in the storage means in synchronism with the timing at which the switches 29, 30 are switched to the settling controller 27 or to the seek controller 28, and sends them to the corresponding settling controller 27 or seek controller 28, thereby producing similar effects to those in the first embodiment.

(2) Configuration of Magnetic Disc Apparatus According to Second Embodiment

Figure 7:
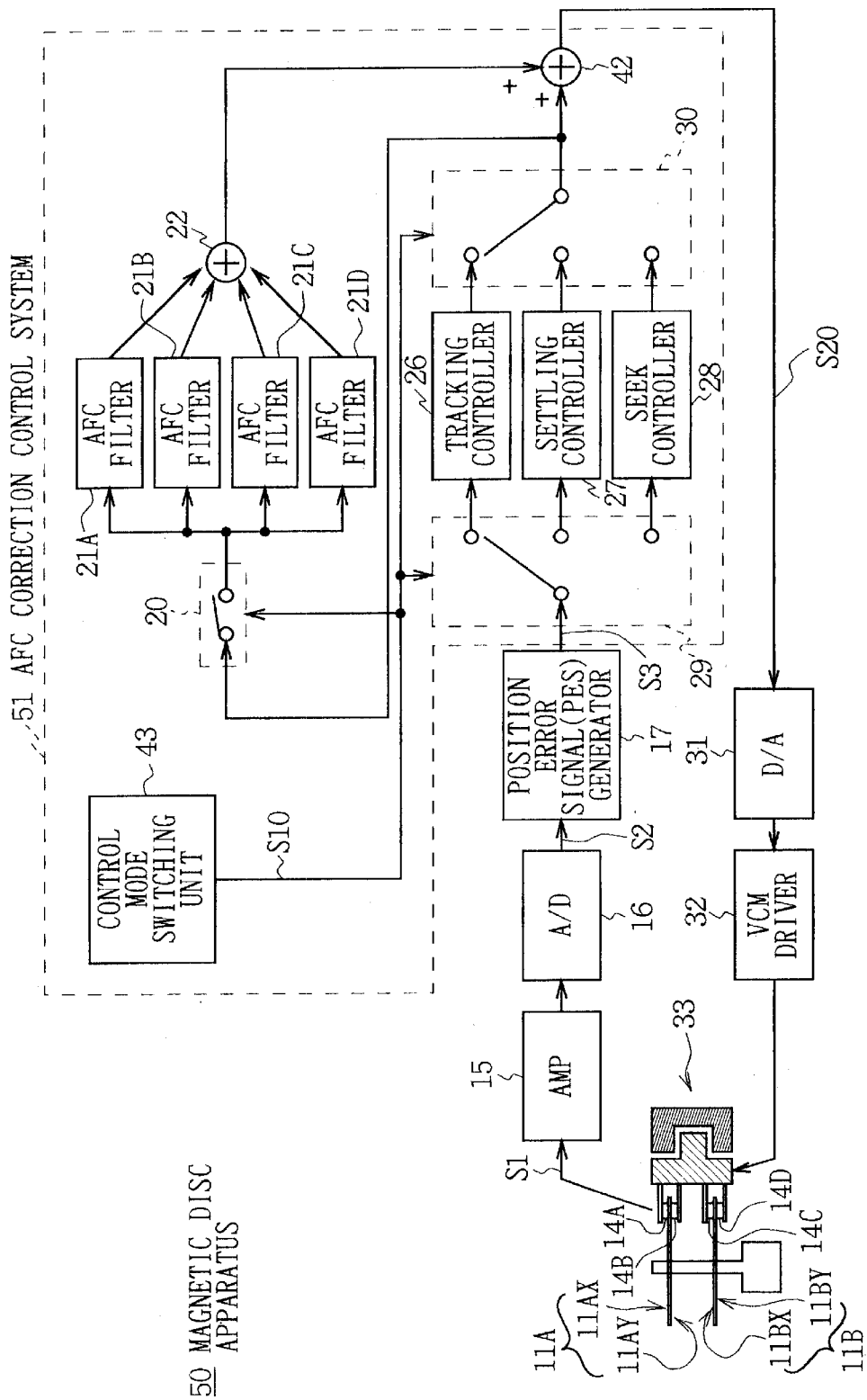
FIG. 7 is a block diagram illustrating the configuration of a magnetic disc apparatus according to a second embodiment.

In FIG. 7, wherein parts corresponding to those in FIG. 3 are designated the same reference numerals, illustrates a magnetic disc apparatus 50 according to a second embodiment which is configured in a manner similar to the magnetic disc apparatus 40 according to the first embodiment except that an AFC correction control system 51 has a different configuration.

In this AFC correction control system 51, AFC filters 21A to 21D are not supplied with an error signal S3, but instead supplied with an output of either one of a tracking controller 26, a settling controller 27 and a seek controller 28, selected by a mode switching operation of a control mode switching unit 43.

In the magnetic disc apparatus 50 configured as described above, when first-order to fourth-order components of a disc rotation synchronized disturbance occur due to high speed rotation of the magnetic discs 11A, 11B, a disturbance frequency synchronized with the rotational frequency of the respective magnetic discs 11A, 11B occurs in a reference signal S2 reproduced from servo regions on the disc faces corresponding to the order numbers of the external disturbance.

In the tracking mode, the error signal S3 generated on the basis of the reference signal S2 passes through the selected tracking controller 26, the output of which passes through the AFC filters 21A to1D and an adder 22 in sequence, where the aforementioned AFC calculation processing is executed on the error signal S3, and is then added to the output of the tracking controller 26 in an adder 42, and outputted as an AFC correction signal S20.

By feedback controlling the AFC correction signal S20 in a tracking servo loop including the tracking controller 26, AFC coefficients derived by the respective AFC calculation processing of the AFC filters 21A to 21D are sequentially updated and converged to predetermined values. Consequently, the magnetic heads 14A to 14D are correctly controlled for tracking in accordance with the AFC correction signal S20 which has been corrected for the disc rotation synchronized disturbance.

Here, when the magnetic heads 14A to 14D currently held on tracking controlled tracks (first target tracks) are positioned to next target tracks (second target tracks), the mode is switched from the tracking mode to the seek mode at this time to have the magnetic heads 14A to 14D seek from the currently positioned tracks to the next target tracks.

In this event, the finally converged values in the preceding tracking mode immediately before the mode was switched are applied for the AFC coefficients derived by the AFC calculation processing of the AFC filters 21A to 21D. Specifically, after the AFC filters 21A–21D have executed the AFC calculation processing on the output of the seek controller 28 based on the converged values, the adder 42 adds the calculation processing results of the AFC filters 21A to 21D to the output of the seek controller 28.

Thus, even in the seek mode in which the magnetic heads 14A to 14D involve a larger amount of travel, it is possible to correct the disc rotation synchronized disturbance occurring in the output of the seek controller 28 based on the AFC coefficients derived by the AFC calculation processing in the tracking mode.

According to the configuration described above, the magnetic disc apparatus 50 corrects the disturbance frequency synchronized with the rotational frequency of disc recording media in the seek mode based on the AFC coefficients derived by the AFC calculation processing when the tracking control was performed on the basis of the error signal S3, so that the disc rotation synchronized disturbance can be corrected even in an operation in which the magnetic heads 14A to 14D involve a large amount of travel as is the case of the seek mode, thereby making it possible to realize the magnetic disc apparatus 50 which is capable of improving the head positioning accuracy in a simple configuration.

(3) Configuration of Magnetic Disc Apparatus According to Third Embodiment

Figure 8:
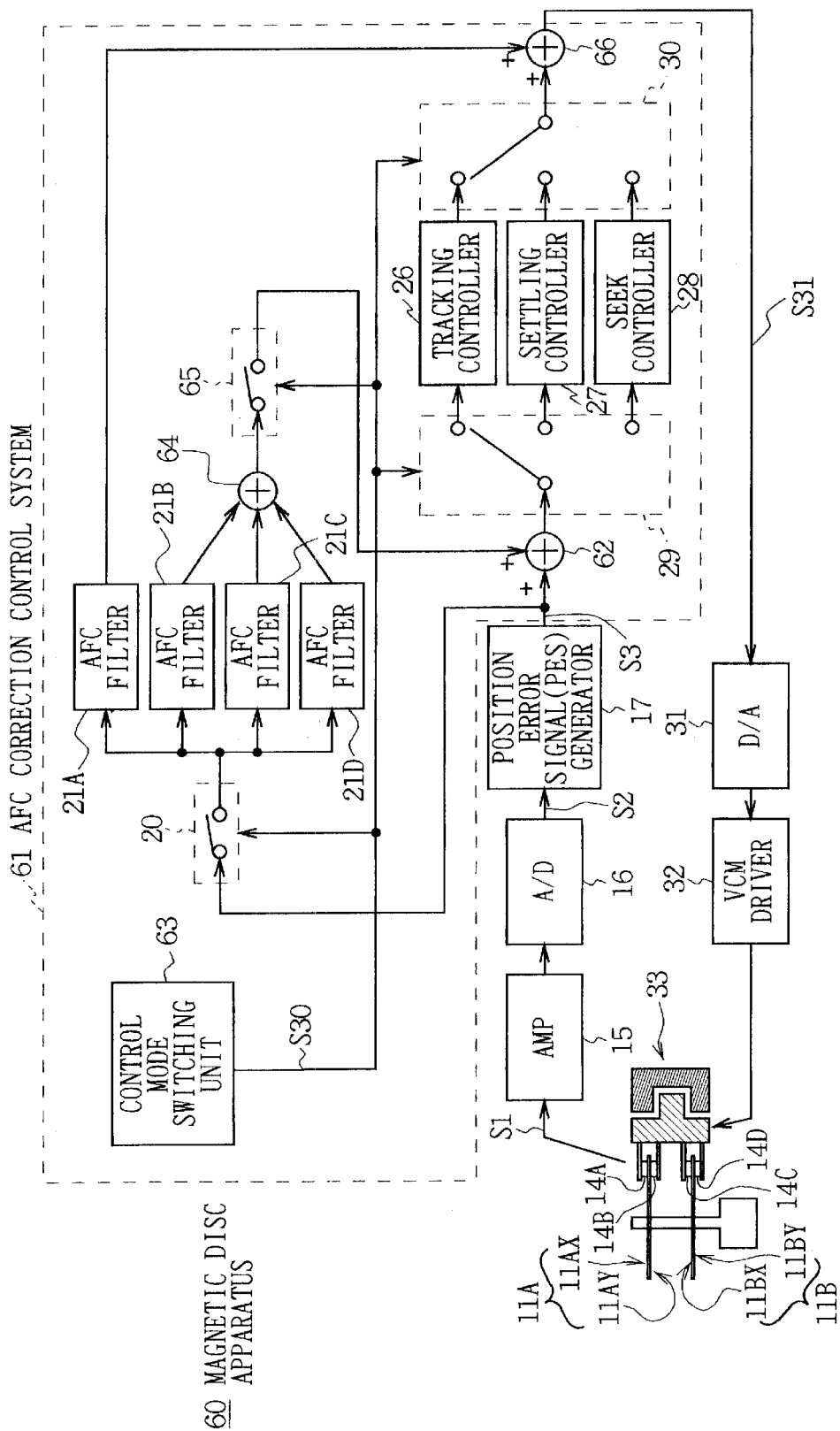
FIG. 8 is a block diagram illustrating the configuration of a magnetic disc apparatus according to a third embodiment.

In FIG. 8, where parts corresponding to those in FIG. 3 are designated the same reference numerals, illustrates a magnetic disc apparatus 60 according to a third embodiment which is configured in a manner similar to the magnetic disc apparatus 40 according to the first embodiment except that an AFC correction control system 61 has a different configuration.

In this AFC correction control system 61, AFC filters 21A to 21D are respectively supplied with an error signal S3. Within these AFC filters 21A to 21D, the AFC filter 21A, corresponding to the first-order component of a disc rotation synchronized disturbance, sends its output to an adder 66 at the rear stage of a tracking controller 26, while the AFC filters 21B to 21C, corresponding to the second-order to fourth-order components of the disc rotation synchronized disturbance, send their outputs to an adder 62 at a front stage of the tracking controller 26 through an adder 64 and a switch 65.

This means that the AFC filters 21B to 21D, corresponding to the second-order to fourth-order components of disc rotation synchronized disturbance, can apply converged values of AFC coefficients derived when a tracking control was performed, even in the seek mode or in the settling mode.

Specifically, the switches 20, 65 are switched on the basis of a mode switching signal S30 generated from a control mode switching unit 63 to an ON state from the time a predetermined time period has been elapsed in the settling mode to the tracking mode, and otherwise to an OFF state from the seek mode to the time the predetermined time period has been elapsed in the settling mode.

In the magnetic disc apparatus 60 configured as described above, when first-order to fourth-order components of a disc rotation synchronized disturbance occur due to high speed rotation of the magnetic discs 11A, 11B, the disturbance frequency synchronized with the rotational frequency of the respective magnetic discs 11A, 11B occurs in a reference signal S2 reproduced from servo regions on the disc faces corresponding to the order numbers of the external disturbance.

In the tracking mode, the error signal S3 generated on the basis of the reference signal S2 passes through the AFC filters 21B–21D corresponding to the second-order to fourth-order components of the disc rotation synchronized disturbance and an adder 64 in sequence, wherein the aforementioned AFC calculation processing is executed on the error signal S3, and is then added to the original error signal S3 in the adder 62, and inputted to the tracking controller 26. Simultaneously, the error signal S3 passes through the AFC filter 21A corresponding to the first-order component of the disc rotation synchronized disturbance, wherein the aforementioned AFC calculation processing is executed on the error signal S3, and is then added to the output of the tracking controller 26 in the adder 66 and outputted as an AFC correction signal S31.

By feedback controlling the AFC correction signal S31 in a tracking servo loop including the tracking controller 26, AFC coefficients derived by the respective AFC calculation processing of the AFC filters 21A to 21D are sequentially updated and converged to predetermined values. Consequently, the magnetic heads 14A to 14D are correctly controlled for tracking in accordance with the AFC correction signal S31 which has been corrected for the disc rotation synchronized disturbance.

Here, when the magnetic heads 14A to 14D currently held on tracking controlled tracks (first target tracks) are positioned to next target tracks (second target tracks), the mode is switched from the tracking mode to the seek mode at this time to have the magnetic heads 14A to 14D seek from the currently positioned tracks to the next target tracks.

In this event, while the converged values derived when the tracking control was performed are applied to the AFC coefficients derived by the AFC calculation processing of the AFC filters 21B to 21D, the finally converged values in the preceding tracking mode immediately before the mode was switched are applied to the AFC coefficients derived by the AFC calculation processing of the AFC filter 21A.

Specifically, the AFC filters 21B to 21D, after executing the AFC calculation processing for the error signal S3 based on the converged values of the AFC coefficients in the tracking mode, input the calculation processing results to a seek controller 28 through the adder 62. On the other hand, after the AFC filter 21A has executed the AFC calculation processing for the output of the seek controller 28 based on the finally converged values in the preceding tracking mode immediately before the mode was switched, the adder 66 adds the calculation processing result of the AFC filter 21A to the output of the seek controller 28.

Thus, even in the seek mode in which the magnetic heads 14A to 14D involve a larger amount of travel, it is possible to correct the disc rotation synchronized disturbance occurring in the output of the seek controller 28 based on the AFC coefficients derived by the AFC calculation processing in the tracking mode.

I According to the configuration described above, the magnetic disc apparatus 60 corrects the disturbance frequency synchronized with the rotational frequency of disc recording media in the seek mode based on the AFC coefficients derived by the AFC calculation processing when the tracking control was performed on the basis of the error signal S3, so that the disc rotation synchronized disturbance can be corrected even in an operation in which the magnetic heads 14A to 14D involve a large amount of travel as is the case of the seek mode, thereby making it possible to realize the magnetic disc apparatus 60 which is capable of improving the head positioning accuracy in a simple configuration.

(4) Configuration of Magnetic Disc Apparatus According to Fourth Embodiment

Figure 9:
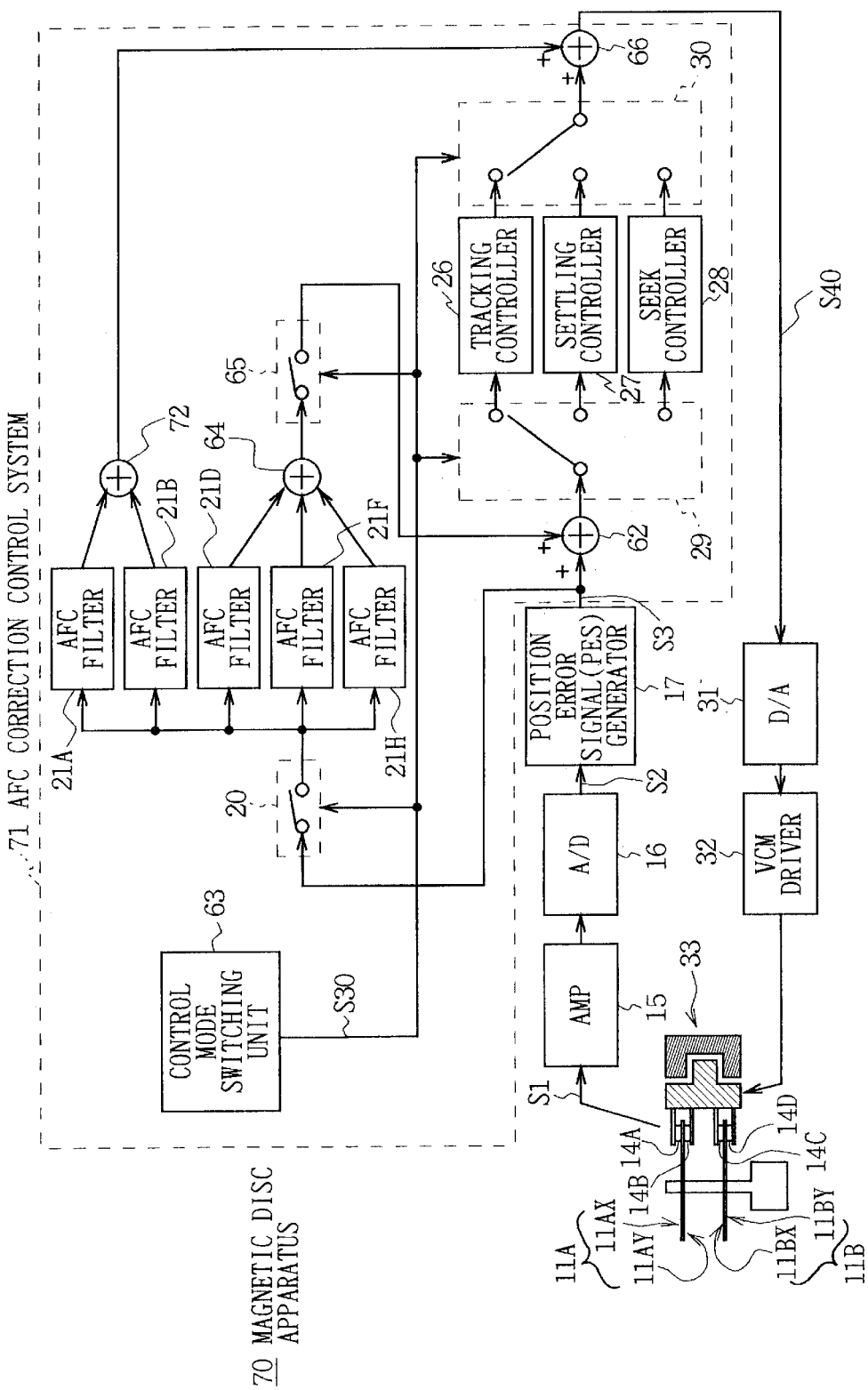
FIG. 9 is a block diagram illustrating the configuration of a magnetic disc apparatus according to a fourth embodiment.

In FIG. 9, where parts corresponding to those in FIG. 8 are designated the same reference numerals, illustrates a magnetic disc apparatus 70 according to a fourth embodiment which is configured in a manner similar to the magnetic disc apparatus 60 according to the third embodiment except that an AFC correction control system 71 has a different configuration.

In this AFC correction control system 71, AFC filters 21A, 21B, 21D, 21F, 21H are respectively supplied with an error signal S3. Within these AFC filters, the AFC filters 21A, 21B, corresponding to first-order and second order components of a disc rotation synchronized disturbance, send their outputs to an adder 66 at a rear stage of a tracking controller 26, while the AFC filters 21D, 21F, 21H, corresponding to fourth-order, sixth-order and eighth order components of the disc rotation synchronized disturbance, send their outputs to an adder 62 at a front stage of the tracking controller 26 through an adder 64 and a switch 65.

This means that the AFC filters 21D, 21F, 21H, corresponding to the fourth-order, sixth-order and eighth-order components of the disc rotation synchronized disturbance, can apply converged values of AFC coefficients derived when a tracking control was performed, even in the seek mode or in the settling mode. Specifically, assuming that the rotational frequency of the magnetic discs 11A, 11B is $\omega/2\pi$, system functions $C_6(z)$, $C_8(z)$ of the AFC filters 21F, 21H for canceling the sixth-order and eighth-order components of the disc rotation synchronized disturbance are expressed by the following equations, respectively:

$$C_6(z) = g_6 \frac{z(\cos(\Phi_6)z - \cos(6\omega T + \Phi_6))}{z^2 - 2\cos(6\omega T)z + 1} \quad (16)$$

$$C_8(z) = g_8 \frac{z(\cos(\Phi_8)z - \cos(8\omega T + \Phi_8))}{z^2 - 2\cos(8\omega T)z + 1} \quad (17)$$

In the magnetic disc apparatus 70 configured as described if- above, when first-order, second-order, fourth-order, six-order and eighth-order components of a disc rotation synchronized disturbance occur due to high speed rotation of the magnetic discs 11A, 11B, the disturbance frequency synchronized with the rotational frequency of the respective magnetic discs 11A, 11B occurs in a reference signal S2 reproduced from servo regions on the disc faces corresponding to the order numbers of the external disturbance.

In the tracking mode, the error signal S3 generated on the basis of the reference signal S2 passes through the AFC filters 21D, 21F, 21H corresponding to the fourth-order, sixth-order and eighth-order components of the disc rotation synchronized disturbance and the adder 64 in sequence, wherein the aforementioned AFC calculation processing is executed on the error signal S3, and is then added to the original error signal S3 in the adder 62, and inputted to the tracking controller 26. Simultaneously, the error signal S3 passes through the AFC filters 21A, 21B corresponding to the first-order and second-order components of the disc rotation synchronized disturbance, wherein the aforementioned AFC calculation processing is executed on the error signal S3, and is then added to the output of the tracking controller 26 in the adder 66, and outputted as an AFC correction signal S40.

By feedback controlling the AFC correction signal S40 in a tracking servo loop including the tracking controller 26, AFC coefficients derived by the respective AFC calculation processing of the AFC filters 21A, 21B, 21D, 21F, 21H are sequentially updated and converged to predetermined values. Consequently, the magnetic heads 14A to 14D are correctly controlled for tracking in accordance with the AFC correction signal S40 which has been corrected for the disc rotation synchronized disturbance.

Here, when the magnetic heads 14A to 14D currently held on tracking controlled tracks (first target tracks) are positioned to next target tracks (second target tracks), the mode is switched from the tracking mode to the seek mode at this time to have the magnetic heads 14A to 14D seek from the currently positioned tracks to the next target tracks.

In this event, while the converged values derived when the tracking control was performed are applied to the AFC coefficients derived by the AFC calculation processing of the AFC filters 21D, 21F, 21H, the finally converged values in the preceding tracking mode immediately before the mode was switched are applied to the AFC coefficients derived by the AFC calculation processing of the AFC filters 21A, 21B.

Specifically, the AFC filters 21D, 21F, 21H, after executing the AFC calculation processing for the error signal S3 based on the converged values of the AFC coefficients in the tracking mode, input the calculation processing results to a seek controller 28 through the adder 62. On the other hand, after the AFC filters 21A, 21B have executed the AFC calculation processing for the output of the seek controller 28 based on the finally converged values in the preceding tracking mode immediately before the mode was switched, the adder 66 adds the calculation processing results of the AFC filters 21A, 21B to the output of the seek controller 28.

Thus, even in the seek mode in which the magnetic heads 14A to 14D involve a larger amount of travel, it is possible to correct the disc rotation synchronized disturbance occurring in the output of the seek controller 28 based on the AFC coefficients derived by the AFC calculation processing in the tracking mode.

According to the configuration described above, the magnetic disc apparatus 70 corrects the disturbance frequency synchronized with the rotational frequency of the disc recording media in the seek mode based on the AFC coefficients derived by the AFC calculation processing when the tracking control was performed on the basis of the error signal S3, so that the disc rotation synchronized disturbance can be corrected even in an operation in which the magnetic heads 14A to 14D involve a large amount of travel as is the case of the seek mode, thereby making it possible to realize the magnetic disc apparatus 70 which is capable of improving the head positioning accuracy in a simple configuration.

(5) Configuration of Magnetic Disc Apparatus According to Fifth Embodiment

Figure 10:
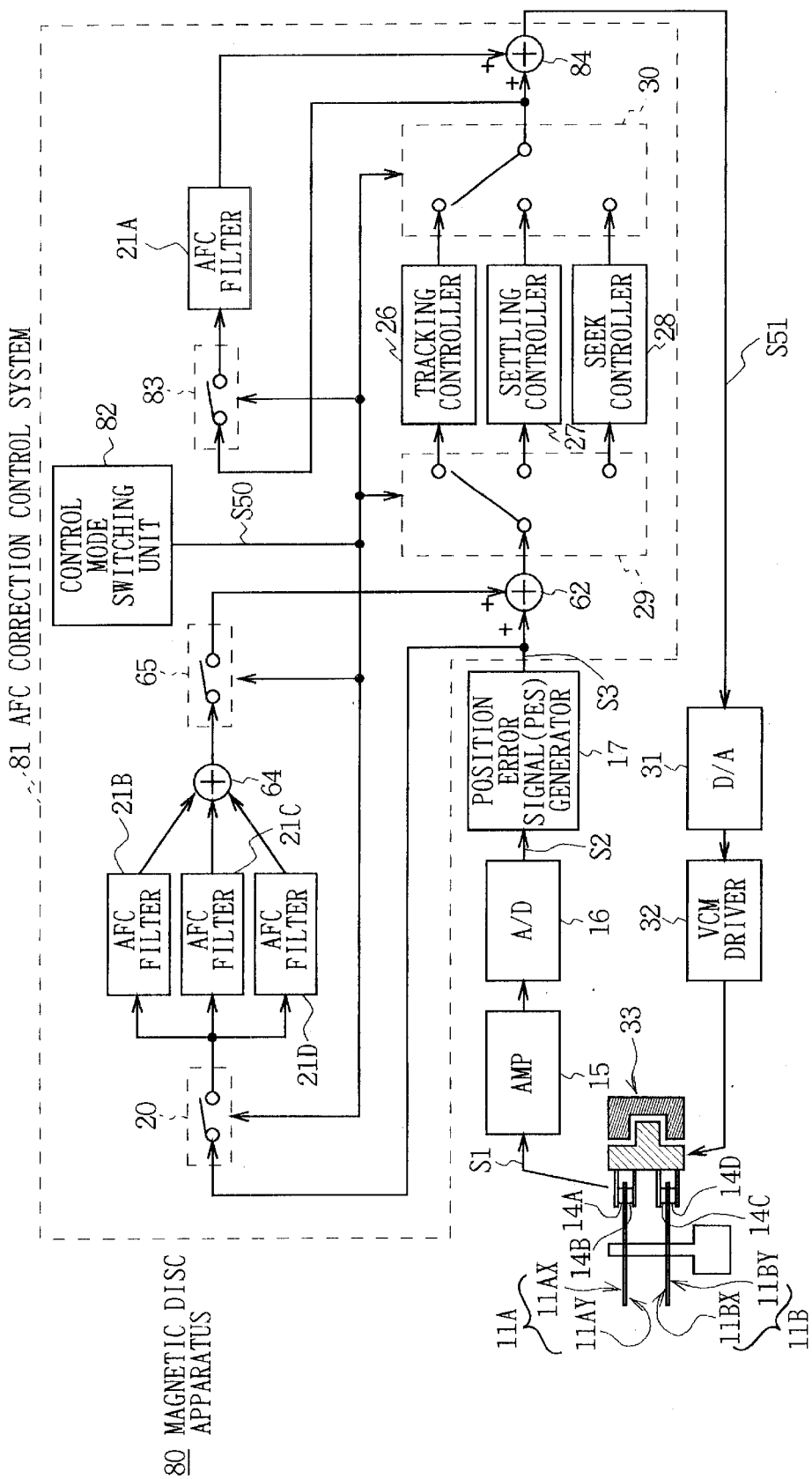
FIG. 10 is a block diagram illustrating the configuration of a magnetic disc apparatus according to a fifth embodiment.

In FIG. 10, where parts corresponding to those in FIG. 8 are designated the same reference numerals, illustrates a magnetic disc apparatus 80 according to a fifth embodiment which is configured in a manner similar to the magnetic disc apparatus 60 according to the third embodiment except that an AFC correction control system 81 has a different configuration.

In this AFC correction control system 81, AFC filters 21B to 21D corresponding to second-order to fourth-order components of a disc rotation synchronized disturbance are respectively supplied with an error signal S3. These AFC filters send their outputs to an adder 62 at a front stage of a tracking controller 26 through an adder 64 and a switch 65. This means that the AFC filters 21B to 21D, corresponding to the second-order to fourth-order components of the disc rotation synchronized disturbance, can apply converged values of AFC coefficients derived when a tracking control was performed, even in the seek mode or in the settling mode.

Also, an AFC filter 21A corresponding to a first-order component of the disc rotation synchronized disturbance is supplied with an output of either one of the tracking controller 26, a settling controller 27 and a seek controller 28 selected by a mode switching operation of a control code switching unit 82.

Specifically, the switches 20, 65, 83 are switched on the basis of a mode switching signal S50 generated from the control mode switching unit 82 to an ON state from the time a predetermined time period has been elapsed in the settling mode to the tracking mode, and otherwise to an OFF state from the seek mode to the time the predetermined time period has been elapsed in the settling mode.

In the magnetic disc apparatus 80 configured as described above, when first-order to fourth-order components of a disc rotation synchronized disturbance occur due to high speed rotation of the magnetic discs 11A, 11B, the disturbance frequency synchronized with the rotational frequency of the respective magnetic discs 11A, 11B occurs in a reference signal S2 reproduced from servo regions on the disc faces corresponding to the order numbers of the external disturbance.

In the tracking mode, the error signal S3 generated on the basis of the reference signal S2 passes through the AFC filters 21B to 21D corresponding to the second-order to fourth-order components of the disc rotation synchronized disturbance and the adder 64 in sequence, wherein the aforementioned AFC calculation processing is executed on the error signal S3, and is then added to the original error signal S3 in the adder 62, and inputted to the tracking controller 26. The output of the tracking controller 26 in the tracking mode, in turn, passes through the AFC filter 21A and an adder 84 in sequence, wherein the aforementioned AFC calculation processing is executed on the error signal S3, and is then added to the output of the tracking controller 26 in the adder 84 and outputted as an AFC correction signal S51.

By feedback controlling the AFC correction signal S51 in a tracking servo loop including the tracking controller 26, AFC coefficients derived by the respective AFC calculation processing of the AFC filters 21A to 21D are sequentially updated and converged to predetermined values. Consequently, the magnetic heads 14A to 14D are correctly controlled for tracking in accordance with the AFC correction signal S51 which has been corrected for the disc rotation synchronized disturbance.

Here, when the magnetic heads 14A to 14D currently held on tracking controlled tracks (first target tracks) are positioned to next target tracks (second target tracks), the mode is switched from the tracking mode to the seek mode at this time to have the magnetic heads 14A to 14D seek from the currently positioned tracks to the next target tracks.

In this event, while the converged values derived when the tracking control was performed are applied to the AFC coefficients derived by the AFC calculation processing of the AFC filters 21B to 21D, the finally converged values in the preceding tracking mode immediately before the mode was switched are applied to the AFC coefficients derived by the AFC calculation processing of the AFC filter 21A.

Specifically, the AFC filters 21B to 21D, after executing the AFC calculation processing for the error signal S3 based on the converged values of the AFC coefficients in the tracking mode, input the calculation processing results to the seek controller 28 through the adder 62. On the other hand, after the AFC filter 21A has executed the AFC calculation processing for the output of the seek controller 28 based on the finally converged values in the preceding tracking mode immediately before the mode was switched, the adder 84 adds the calculation processing result of the AFC filter 21A to the output of the seek controller 28.

Thus, even in the seek mode in which the magnetic heads 14A to 14D involve a larger amount of travel, it is possible to correct the disc rotation synchronized disturbance occurring in the output of the seek controller 28 based on the AFC coefficients derived by the AFC calculation processing in the tracking mode.

According to the configuration described above, the magnetic disc apparatus 80 corrects the disturbance frequency synchronized with the rotational frequency of the disc recording media in the seek mode based on the AFC coefficients derived by the AFC calculation processing when the tracking control was performed on the basis of the error signal S3, so that the disc rotation synchronized disturbance can be corrected even in an operation in which the magnetic heads 14A to 14D involve a large amount of travel as is the case of the seek mode, thereby making it possible to realize the magnetic disc apparatus 80 which is capable of improving the head positioning accuracy in a simple configuration.

(6) Configuration of Magnetic Disc Apparatus According to Sixth Embodiment

Figure 11:
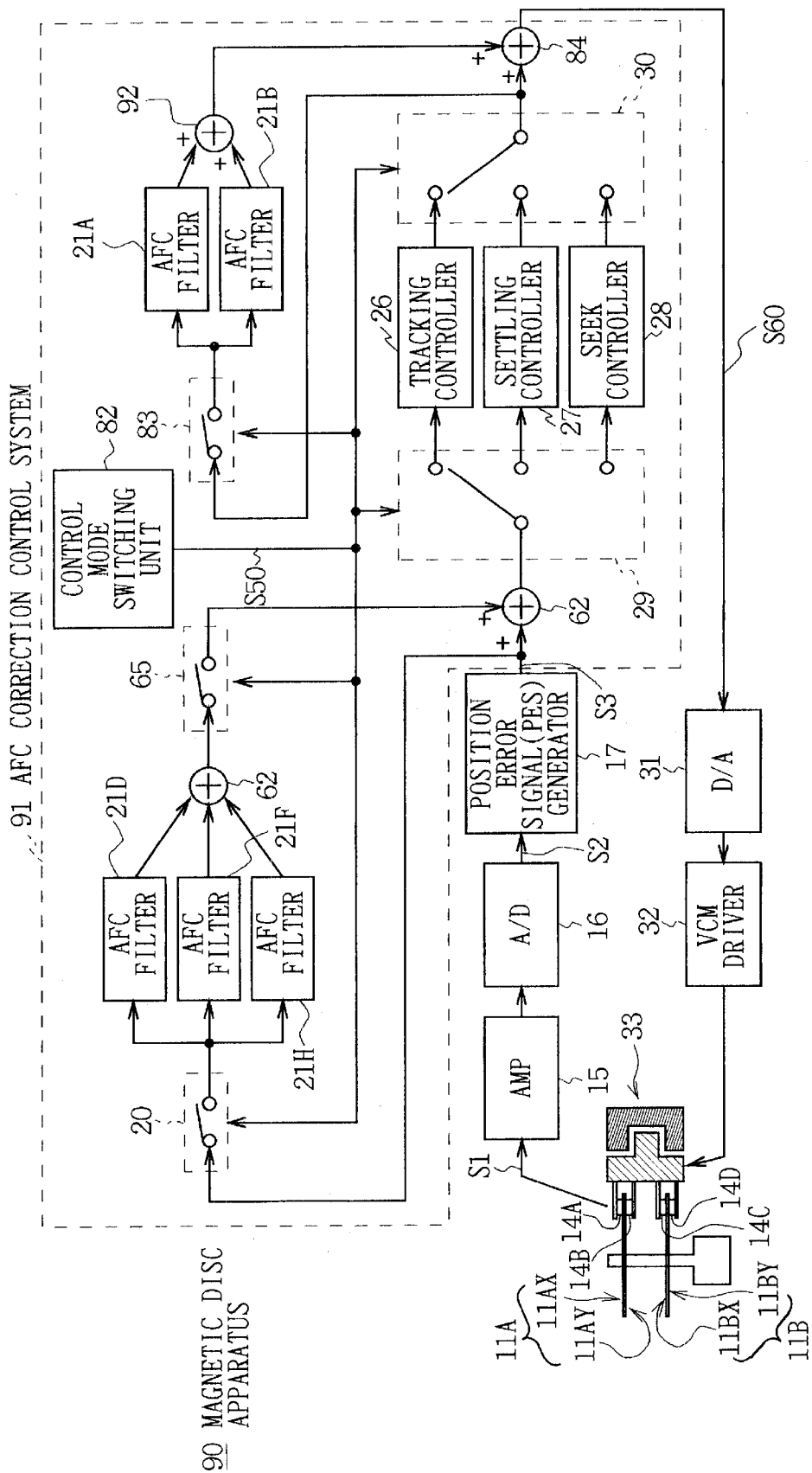
FIG. 11 is a block diagram illustrating the configuration of a magnetic disc apparatus according to a sixth embodiment.

In FIG. 11, where parts corresponding to those in FIG. 9 are designated the same reference numerals, illustrates a magnetic disc apparatus 90 according to a sixth embodiment which is configured in a manner similar to the magnetic disc apparatus 70 according to the fourth embodiment except that an AFC correction control system 91 has a different configuration.

In this AFC correction control system 91, AFC filters 21D, 21F, 21H corresponding to fourth-order, sixth-order and eighth-order components of a disc rotation synchronized disturbance are respectively supplied with an error signal S3. These AFC filters send their outputs to an adder 62 at a front stage of a tracking controller 26 through an adder 64 and a switch 65. This means that the AFC filters 21D, 21F, 21H, corresponding to the fourth-order, sixth-order and eighth-order components of the disc rotation synchronized disturbance, can apply converged values of AFC coefficients derived when a tracking control was performed, even in the seek mode or in the settling mode.

Also, AFC filters 21A, 21B corresponding to first-order and second-order components of the disc rotation synchronized disturbance are supplied with an output of either one of the tracking controller 26, a settling controller 27 and a seek controller 28 selected by a mode switching operation of a control mode switching unit 82.

Specifically, the switches 20, 65, 83 are switched on the basis of a mode control signal S50 generated from the control mode switching unit 82 to an ON state from the time a predetermined time period has been elapsed in the settling mode to the tracking mode, and otherwise to an OFF state from the seek mode to the time the predetermined time period has been elapsed in the settling mode.

In the magnetic disc apparatus 90 configured as described above, when first-order, second-order, fourth-order, sixth-order and eighth-order components of a disc rotation synchronized disturbance occur due to high speed rotation of the magnetic discs 11A, 11B, the disturbance frequency synchronized with the rotational frequency of the respective magnetic discs 11A, 11B occurs in a reference signal S2 reproduced from servo regions on the disc faces corresponding to the order numbers of the external disturbance.

In the tracking mode, the error signal S3 generated on the basis of the reference signal S2 passes through the AFC filters 21D, 21F, 21H corresponding to the fourth-order, sixth-order and eighth-order components of the disc rotation synchronized disturbance and the adder 64 in sequence, wherein the aforementioned AFC calculation processing is executed on the error signal S3, and is then added to the original error signal S3 in the adder 62, and inputted to the tracking controller 26. The output of the tracking controller 26 in the tracking mode, in turn, passes through the AFC filters 21A, 21B and an adder 84 in sequence, wherein the aforementioned AFC calculation processing is executed on the error signal S3, and is then added to the output of the tracking controller 26 in the adder 84, and outputted as an AFC correction signal S60.

By feedback controlling the AFC correction signal S60 in a tracking servo loop including the tracking controller 26, AFC coefficients derived by the respective AFC calculation processing of the AFC filters 21A, 21B, 21D, 21F, 21H are sequentially updated and converged to predetermined values. Consequently, the magnetic heads 14A to 14D are correctly controlled for tracking in accordance with the AFC correction signal S60 which has been corrected for the disc rotation synchronized disturbance. Here, when the magnetic heads 14A to 14D currently held on tracking controlled tracks (first target tracks) are positioned to next target tracks (second target tracks), the mode is switched from the tracking mode to the seek mode at this time to have the magnetic heads 14A to 14D seek from the currently positioned tracks to the next target tracks.

In this event, while the converged values derived when the tracking control was performed are applied to the AFC coefficients derived by the AFC calculation processing of the AFC filters 21D, 21F, 21H, the finally converged values in the preceding tracking mode immediately before the mode was switched are applied to the AFC coefficients derived by the AFC calculation processing of the AFC filters 21A, 21B.

Specifically, the AFC filters 21D, 21F, 21H, after executing the AFC calculation processing for the error signal S3 based on the converged values of the AFC coefficients in the tracking mode, input the calculation processing results to the seek controller 28 through the adder 62. On the other hand, after the AFC filters 21A, 21B have executed the AFC calculation processing for the output of the seek controller 28 based on the finally converged values in the preceding tracking mode immediately before the mode was switched, the adder 84 adds the calculation processing results of the AFC filters 21A, 21B to the output of the seek controller 28.

Thus, even in the seek mode in which the magnetic heads 14A to 14D involve a larger amount of travel, it is possible to correct the disc rotation synchronized disturbance occurring in the output of the seek controller 28 based on the AFC coefficients derived by the AFC calculation processing in the tracking mode.

According to the configuration described above, the magnetic disc apparatus 90 corrects the disturbance frequency synchronized with the rotational frequency of the disc recording media in the seek mode based on the AFC coefficients derived by the AFC calculation processing when the tracking control was performed on the basis of the error signal S3, so that the disc rotation synchronized disturbance can be corrected even in an operation in which the magnetic heads 14A to 14D involve a large amount of travel as is the case of the seek mode, thereby making it possible to realize the magnetic disc apparatus 90 which is capable of improving the head positioning accuracy in a simple configuration.

(7) Other Embodiments

Note that, in the foregoing embodiments, the AFC (Adaptive Feedforward Canceler) filters 21A, 21D, 21F, 21H are applied as the frequency correcting means for correcting the disturbance frequency which occurs in synchronism with the rotational frequency of the magnetic discs 11A, 11B based on the error signal S3. The present invention, however, is not limited thereto and a variety of other filters can be employed for removing a disturbance at a particular frequency. In essence, a variety of frequency correcting means can be widely applied as long as they can suppress a disturbance frequency which occurs in synchronism with the rotational frequency of the magnetic discs 11A, 11B.

Also, in the foregoing embodiments, the head moving means for moving the magnetic heads 14A to 14D to neighboring positions of next target tracks (second target tracks) on the magnetic discs 11A, 11B based on the error signal S3 and the frequency correction coefficients (AFC coefficients) is composed mainly of the seek controller 28, the voice coil motor driver 32 and the voice coil motor 33. The present invention, however, is not limited to this particular configuration of the head moving means, and alternatively, the head moving means can be composed of the settling controller 27, the voice coil motor driver 32 and the voice coil motor 33. Further alternatively, a single controller can be provided for performing the seek control and the settling control as a sequence of operations, such that the head moving means is composed of this controller, the voice coil motor driver 32 and the voice coil motor 33.

Further, in the foregoing embodiments, as ith order components of a disc rotation synchronized disturbance, first-order to fourth-order, sixth-order and eighth-order components of the disc rotation synchronized disturbance occur in synchronism with the rotation of the magnetic discs 11A, 11B. The present invention, however, is not limited to such a disc rotation synchronized disturbance, but can be applied to correct third-order, fifth-order or ninth-order or more components of a disc rotation synchronized disturbance in the frequency correcting means in accordance with the magnitude of the disc rotation synchronized disturbance.

Further, while in the foregoing embodiments, the present invention has been applied to the magnetic disc apparatus 40, 50, 60, 70, 80, 90 for recording on or reproducing from the magnetic discs 11A, 11B, the present invention is not limited to the application of such magnetic disc apparatus, but can be widely applied to any apparatus which may require suppression of disc rotation synchronized disturbance upon recording on or reproducing from disc recording media. In this case, optical heads, optical pickups and so on can be widely applied as heads other than the magnetic heads 14A to 14D. In addition, magneto-optical discs, optical discs and so on can be widely applied as the disc recording media other than the magnetic discs 11A, 11B.

According to the present invention as described above, head moving means moves a head from a first target track on a disc recording medium, on which the head is now positioned as a result of a tracking control, to a neighboring position of the next second target track based on frequency correction coefficients derived from frequency correcting means when the tracking control was performed based on a position error signal, so that disc rotation synchronized disturbance occurring in synchronism with the rotational frequency of the disc recording medium can be corrected even in an operation in which the head moving means causes the head to travel over a large amount of distance, thereby making it possible to realize a head positioning apparatus and a method therefor which are capable of significantly improving the head positioning accuracy in a simple configuration.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A head positioning control apparatus comprising:
    position error signal generating means for generating a position error signal indicative of the amount of positional deviation of a head with respect to a first target track on a disc recording medium;
    frequency correcting means for generating frequency correction coefficients for correcting a disturbance occurring in synchronism with a rotational frequency of said disc recording medium when a tracking control is performed on the basis of said position error signal;
    seeking means for moving said head from said first target track on said disc recording medium, on which said head is positioned as a result of said tracking control, to a neighboring position of a next second target track, said seeking means controlling the position of said head based on said position error signal and said frequency correction coefficients obtained during tracking control of said first target track; and
    settling means for settling said head at said next second target track based on said position error signal and said frequency correction coefficients obtained during tracking control of said first target track.

2. The head positioning control apparatus according to claim 1, wherein said frequency correcting means divides said disturbance frequency into a plurality of frequency components for each predetermined level, and generates said frequency correction coefficients for correcting a predetermined number of frequency components within said plurality of frequency components.

3. The head positioning control apparatus according to claim 1, wherein
    said frequency correcting means includes, storage means for dividing said recording medium in a radial direction into a plurality of regions, and assigning and storing one of said frequency correction coefficients generated when said tracking control is performed, to each of said regions, and wherein when said seeking means moves said head to the neighboring position of said next second target track, said frequency correction coefficient corresponding to said region in which said next second target track is included, is read and output from said storage means.

4. A head positioning control method comprising the steps of:
    generating a position error signal indicative of the amount of positional deviation of a head with respect to a first target track on a disc recording medium;
    generating frequency correction coefficients for correcting a disturbance frequency occurring in synchronism with a rotational frequency of said disc recording medium when a tracking control is performed on the basis of said position error signal;
    moving said head from said first target track on said disc recording medium, on which said head is positioned as a result of said tracking control, to a neighboring position of a next second target track, wherein said head is moved based on said position error signal and said frequency correction coefficients obtained during tracking control of said first target track; and
    settling said head at said next second target track based on said position error signal and said frequency correction coefficients obtained during tracking control of said first target track.

5. The head positioning control method according to claim 4, wherein said step of generating frequency correction coefficients includes dividing said disturbance frequency into a plurality of frequency components for each predetermined level, and correcting a predetermined number of frequency components within said plurality of frequency components based on said frequency correction coefficients.

6. The head positioning control method according to claim 4, wherein said step of generating frequency correction coefficients includes dividing said disc recording medium in a radial direction into a plurality of regions, assigning each of said regions for one of said frequency correction coefficients generated when said tracking control is performed, and storing said frequency correction coefficients in a storage means; and wherein said head is moved from said first target track to the neighboring position of said next second target track by reading from said storage means said frequency correction coefficient corresponding to said region in which said next second target track is included, and outputs said frequency correction.

* * * * *